US006972151B2

(12) United States Patent
Bronson

(10) Patent No.: US 6,972,151 B2
(45) Date of Patent: Dec. 6, 2005

(54) MAGIC SLATE CAPTURE AND DISPLAY DEVICE

(75) Inventor: Barry Bronson, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 10/423,143

(22) Filed: Apr. 25, 2003

(65) Prior Publication Data

US 2003/0203349 A1 Oct. 30, 2003

Related U.S. Application Data

(62) Division of application No. 09/528,364, filed on Mar. 17, 2000, now Pat. No. 6,578,615.

(51) Int. Cl.[7] ............................................... B32B 27/14

(52) U.S. Cl. ................. 428/195.1; 428/40.8; 428/40.1; 428/442; 428/348; 428/349; 428/350; 428/351; 428/352; 428/353; 428/354; 428/355; 428/196; 428/197; 434/393; 434/410; 273/240; 442/38; 442/39; 442/40; 442/41; 442/149; 442/150; 442/151; 156/386

(58) Field of Search ................................ 428/442, 195, 428/348–355, 40.1, 40.8, 196–97; 156/386; 442/38–41, 442/149–151; 434/393, 410; 273/240

(56) References Cited

U.S. PATENT DOCUMENTS

| | | | | |
|---|---|---|---|---|
| 1,706,046 A | | 3/1929 | Tisdale | |
| 3,149,425 A | | 9/1964 | Barish | |
| 3,279,100 A | | 10/1966 | Knott | |
| 3,381,299 A | | 4/1968 | Hu | |
| 3,914,548 A | | 10/1975 | Barish | |
| 4,051,609 A | * | 10/1977 | Boursaw | 434/410 |
| 4,264,659 A | * | 4/1981 | Pattenden | 428/35.2 |
| 4,801,266 A | | 1/1989 | Kinberg | |
| 5,342,469 A | * | 8/1994 | Bodford et al. | 156/244.22 |
| 5,529,501 A | | 6/1996 | Maruyama | |
| 5,791,910 A | * | 8/1998 | Masson et al. | 434/410 |
| 5,840,142 A | * | 11/1998 | Stevenson et al. | 156/237 |
| 5,869,929 A | * | 2/1999 | Eida et al. | 313/501 |
| 6,498,203 B1 | * | 12/2002 | Kito et al. | 523/161 |

* cited by examiner

*Primary Examiner*—Rena Dye
*Assistant Examiner*—Tamra L. Dicus

(57) ABSTRACT

A device for forming erasable images on a reusable medium, comprising: an erasing portion; and a writing portion; wherein the erasing portion comprises a separator for separating at least two layers of the reusable medium; and wherein the writing portion comprises automatic machine-driven pressure applicators for applying pressure but no ink to the reusable medium, thereby forming an image on the reusable medium.

6 Claims, 4 Drawing Sheets

MAGIC SLATE CAPTURE AND DISPLAY DEVICE

This is a division of application Ser. No. 09/528,364, filed Mar. 17, 2000, now U.S. Pat. No. 6,578,615.

BACKGROUND OF THE INVENTION

1. Field of the Invention

The invention relates to a magic slate capture and display device. In particular, the invention relates to a reusable medium and a device using reusable medium to create erasable images.

2. Description of the Related Art

Existing media such as conventional paper may be printed using dot matrix, impact or ink jet printers or laser printers. Either single sheets or a continuous stream of paper may be fed into the device for printing images such as text data or graphics. In virtually all cases, the ink is permanent. Once such images have been formed on the paper, the printed surface of the paper cannot be printed on again. An ongoing supply of new paper is required. In the case of a device such as a printing calculator, a roll of paper must be replenished as the paper supply is consumed. In both of these applications, there is often no need to keep the printed output more than a short time. Materials are consumed (paper and ink) and cannot effectively be reused.

A toy called the Magic Slate has entertained children for many generations. The toy comprises a hard waxy black base surface, a thin gray film and a thicker clear film on top. Images can be drawn on the top surface of the clear film using a stylus or other pointy pressure tip device. When pressure is applied to the top surface using the stylus, the gray film sticks to the waxy black base material at the point the pressure is applied. This temporary adhesion results in the gray film becoming darker. The wax at the point of adhesion provides an optical path to the black substrate and attenuates reflected light. The thick top layer protects the thin gray layer from damage. To erase the image, the gray film is manually lifted away from the black base, breaking the temporary adhesion.

The above-described toy, however, only allows the forming of images via a hand-held stylus. Thus, the quality and throughput of the images is severely limited by the ability and the efforts expended by the individual forming the image. Also, control of the stylus, regardless of the ability of the user, is limited by the size of the stylus and the relation of the stylus to the amount of pressure required to form the adhesion. Thus, the above-described toy is impractical to form print-quality text and graphic images.

SUMMARY OF THE INVENTION

A device according to the present invention comprises an erasing portion; and a writing portion; wherein the erasing portion comprises a separator for separating at least two layers of the reusable medium; and wherein the writing portion comprises automatic pressure applicators for applying pressure but no ink to the reusable medium, thereby forming an image on the reusable medium. Additional images and annotation can be added manually after the printing process.

In a further embodiment of the present invention, a reusable medium according to the present invention comprises a first layer of a first material; a second layer of a second material; and a layer of adhesive disposed on the first layer and placed between the first layer and the second layer; wherein one of the first layer and adhesive layer contains a color and wherein the layer of adhesive causes an image to be formed on the second layer when the second layer is selectively contacted to the first layer, and wherein the layer of adhesive comprises a plurality of separated regions.

In a further aspect of the present invention, a plurality of the regions of the adhesive may contain a different color.

In a yet further embodiment of the present invention, a method is provided of forming images on a reusable medium. The method comprises erasing the reusable medium by separating at least two layers of the reusable medium, and controlling a plurality of pressure applicators to apply pressure on the reusable medium to create an image.

DETAILED DESCRIPTION OF THE PREFERRED EMBODIMENT

The preferred embodiment of the reusable medium of the present invention will now be described in detail.

Figure 1:
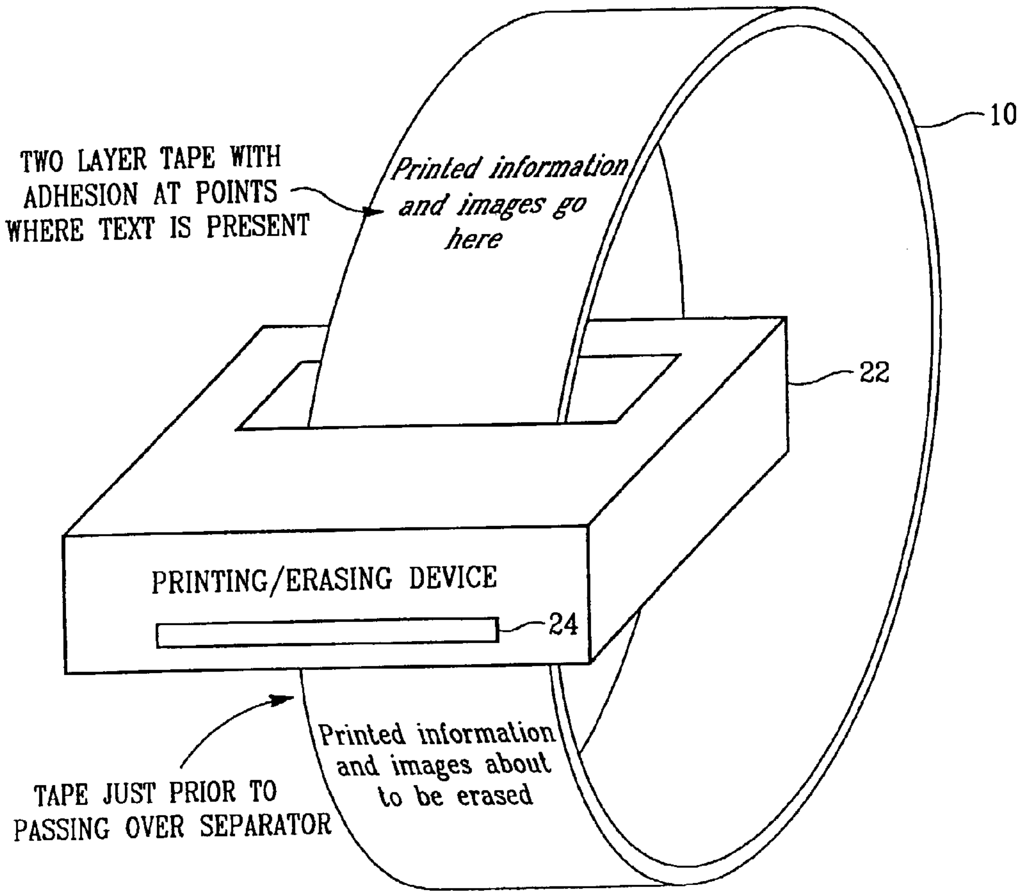
FIG. 1 is a perspective view of the printing/erasing device according to the present invention.
Figure 2:
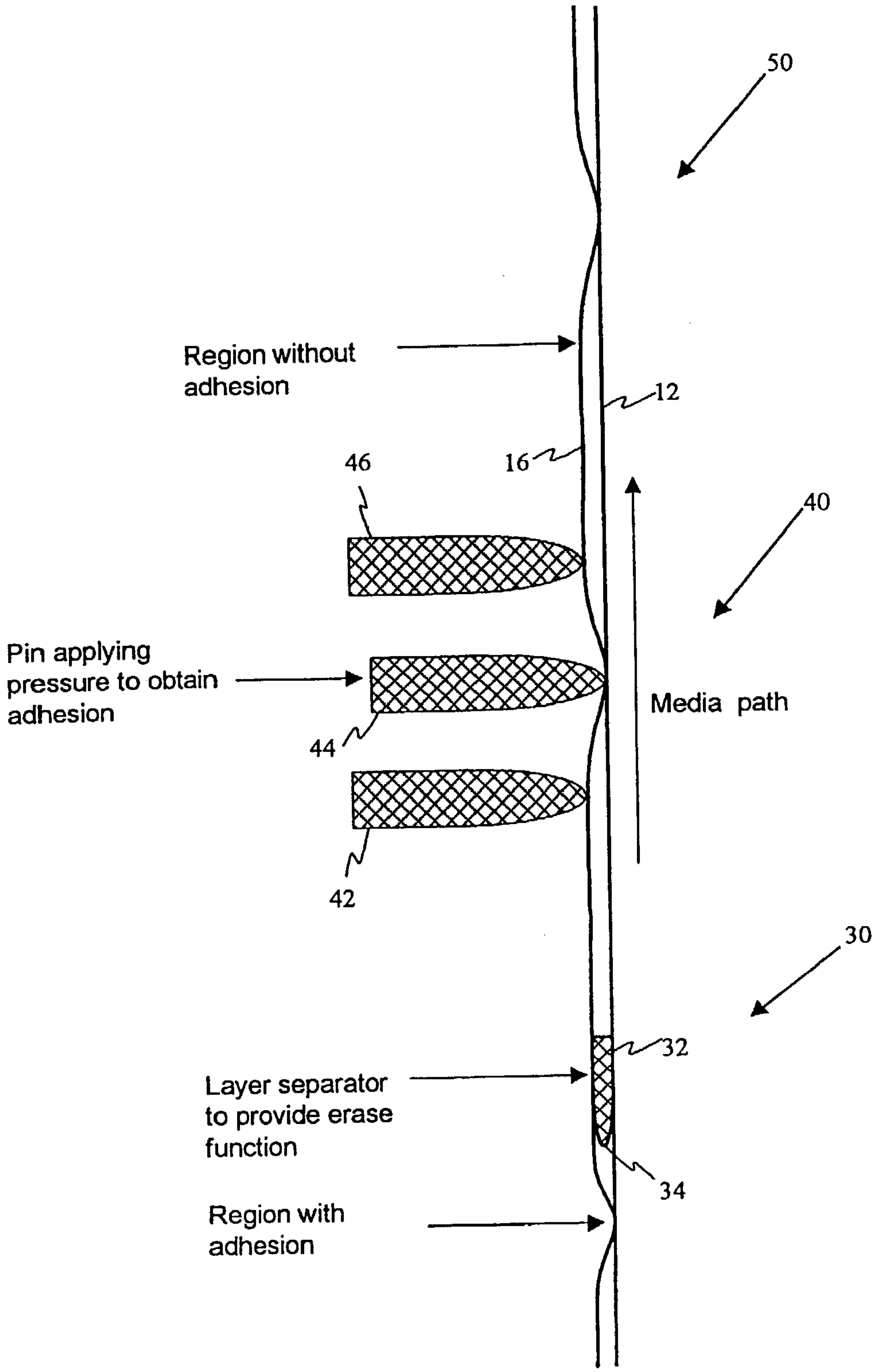
FIG. 2 is a schematic diagram illustrating the operation of the device shown in FIG. 1.

Referring to FIGS. 1 and 2, a reusable medium 10 is provided. The reusable medium 10 comprises a base layer 12 of at least one color, with an adhesive layer 14 (shown in FIGS. 5 and 6) disposed thereover, and a thin layer 16 disposed over the adhesive layer 14. As used in this disclosure, the word color encompasses black and grey.

The base layer 12 may be formed, by way of example but not by way of limitation, by a mylar material, or a polyester film material, or by a thin flexible plastic or a paper product. A typical thickness for the base layer would be in the range of 0.025 mm to 0.0025 mm.

The base layer 12 has a top surface coated with the adhesive layer 14 of a waxy adhesive substance. This substance may be one of many substances well known in the art, including beeswax and paraffin. Typical thicknesses would be on the order of 0.025 mm for a layer 14 operating simply as a light guide for the color therebelow on the base layer 12. Such a waxy substance is capable of transmitting the color from the base layer 12 to the top surface of the waxy layer 14. The waxy substance of the layer 14 is preferably clear, but may be nearly clear or may include a color that appropriately modifies or takes the place of a color matrix patterning of the base layer 12 (to be discussed below). It should be noted that the adhesive layer 14 must have a greater affinity for the base layer 12, relative to the thin layer 16 disposed thereabove (to be discussed in more detail below), and should be translucent and have a refractive index the same as or similar to the thin layer 16 so that there is minimal reflection when the thin layer 16 is in contact with the adhesive layer 14. Accordingly, the adhesive layer 14 comprises a material with both optical and adhesive properties. By the word "adhesive" is not meant a material with strong adhesive properties, but rather a material that causes a layer thereabove to stick to it only in the immediate vicinity where the pressure is applied, and with a sticking force that allows for easy separation by a predetermined element.

The optical adhesive layer 14 may be constructed in a number of ways. By way of example, as noted above, the waxy adhesive layer may contain a pigment that modifies the color of the light transmitted through the thin layer 16 in both directions, or it can be substantially clear and optically couple light of the color reflected by the base layer, as noted above.

The thin layer 16 may be formed by a film of mylar or polyester, for example, that is compliant enough so that the film 16 sticks to the waxy adhesive layer 14 only in the small region where a printing pin presses on it. The thickness will depend on the material chosen, but typically will be in the range of 0.025 mm to 0.0025 mm.

A thicker protective layer (not shown) is optionally provided on top of the thin layer 16. The protective layer should be clear, but may be of a color that appropriately compensates or complements the color from the color matrix patterning of the base layer 12 transmitted through the waxy adhesive layer 14 to the thin layer 16. The protective layer may, by way of example, be made from a material such as mylar or polyester film and typical thickness would be on the order of 0.125 mm.

In operation, when a point or shape is pressed onto the thin layer 16 so that the thin layer makes contact with the adhesive layer 14, then the thin layer 16 adheres to the adhesive layer 14, with the adhering area taking the configuration of the point or other shape that was pressed onto the thin layer 16. The adhesive layer 14 then acts as an optical light guide to conduct light propagating through the thin layer down to the base layer 12, and the color of the base layer at that location is then reflected back through the thin layer 16.

If there is to be only a single color in the base layer 12-adhesive layer 14 combination, then color patterning fabrication steps are unnecessary. In order to provide the reusable medium 10 with color capability, a color matrix patterning may be formed on the base layer 12. Multiple colors can be printed, rolled or screened in a number of possible patterns onto the base layer 12. These patterns can include stripes and mosaic. Typical colors for a reflective color system would include cyan, magenta, yellow, and black.

For a multicolor embodiment using a base layer color, it may be desirable to provide some form of optical light guides and light shutters to avoid color contamination due to diffusion of light from the sides of the adhesive layer 14. By "color contamination" is meant color bleeding from one region to another due to the side diffusion of light. By way of example, referring to FIGS. 4–6, color is deposited in a matrix of regions or pixels 15 onto the surface of the base layer 12. A light guide may be created by depositing the clear waxy material of the adhesive layer 14 over the entire surface of the base layer 12. However, in a preferred embodiment, light guides are created in the form of the accurate placement of the clear waxy material of the adhesive layer 14 only in regions or pixels covering over all or a portion of the color segments 15 deposited on the base layer 12, leaving a space 17 between neighboring regions of waxy material adhesive 14, as shown in FIG. 6. The regions of waxy adhesive 14 may be in the form of dots, squares, stripes or other shapes. There could be one or multiple waxy material deposits 14 over each color base layer patterned element 15. The processes for placing and attaching the waxy material deposits or pixels 14 over the color base layer pattern include molding, stamping, screening, printing, sputtering, spraying, and etching. The resulting structure creates a sharper definition of colors and isolation of colors from one region to another, i.e., it creates a crisper boundary between color regions.

Figure 4:
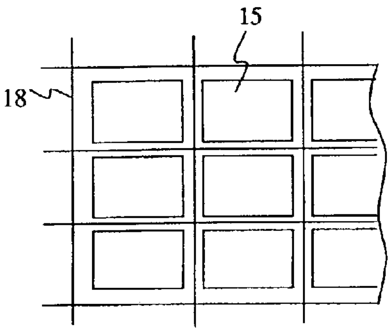
FIG. 4 is a schematic top view of one embodiment of the base layer and adhesive layer of the reusable medium.
Figure 5:
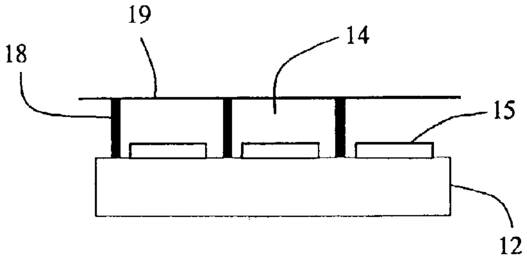
FIG. 5 is a schematic side view of the embodiment shown in FIG. 4.
Figure 6:
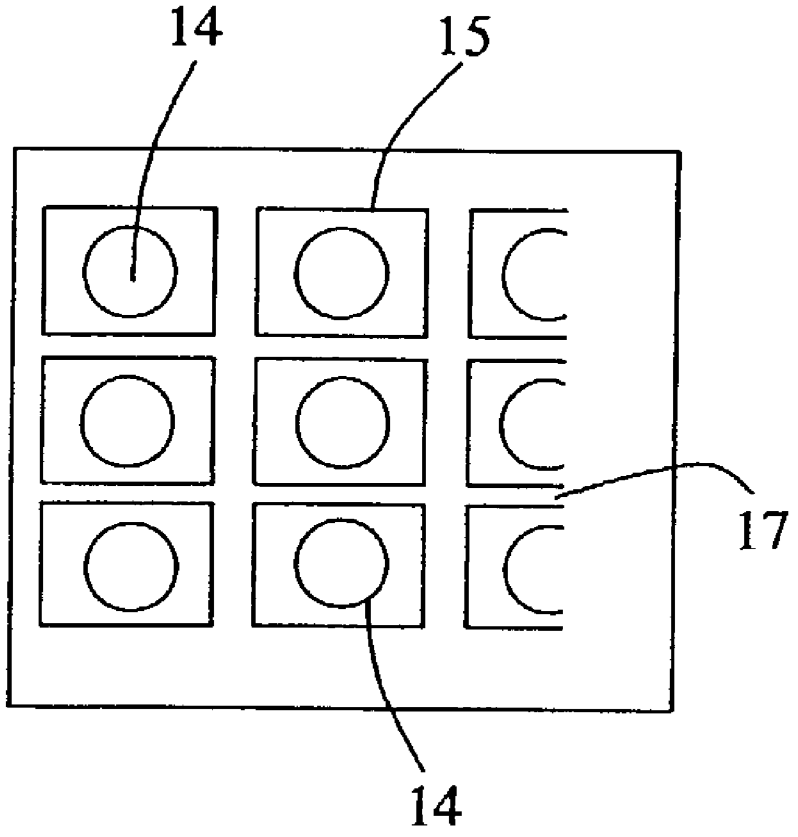
FIG. 6 is a schematic top view of an embodiment of the base layer and adhesive layer.

To avoid further light contamination from adjacent color regions 15 on the base layer 12 and to provide a sharper definition of colors between adjacent regions with isolation of colors, it may be desirable to apply a thin mesh of light blocking material 18 between the waxy layer pixels 14, as shown in FIGS. 4 and 5. This mesh layer 18, applied to the base layer 12, could also serve as a mold for the waxy layer deposits or pixels 14. The light blocking mesh material 18 preferably would be substantially as tall as the waxy material pixels 14 are thick. The mesh material may be made from a variety of materials, including plastic, rubber, and paper, and preferably would be a black or other dark color.

A preferred embodiment of the top surface of the waxy layer 14 would produce good adhesion with the thin layer 16 over the full pixel area to achieve maximum light coupling and fill factor. It may be desirable to follow the deposition of the waxy material with a planarization step to produce a flat surface.

When pressure is applied to a point on the thin layer 16, that point on the thin layer is adhered by the waxy adhesive layer 14 to a corresponding point on the base layer 12. This point on the base layer 12 has a certain color. When light propagates through the thin layer 16 and the adhesive layer 14 to a particular point on the color matrix pattern on the base layer 12, that light is reflected by the color on the base layer, so that the base layer color is visible. Thus, the color of the point in the color matrix patterning on the base layer 12 is transmitted through the waxy substance of the adhesive layer 14 to the thin layer 16, thereby causing the thin layer 16 to appear to have that particular matrix color at the point at which pressure is applied.

As noted, the adhesion caused by the adhesive characteristics of the waxy substance is not a permanent adhesion. The adhesive characteristics of the waxy substance are strong enough to maintain the adhesion until a predetermined force is applied to break the adhesion. When the force is applied, the adhesion should break easily and cleanly.

The adhesion may be broken either manually or with an electro-mechanical element. To facilitate breaking of the adhesion manually, the sheet of the reusable medium 10 may include a corner flap where no waxy substance exists. An operator can easily grasp this corner flap and peel the thin layer 16 away from the base layer 12 and the waxy adhesive layer 14. At one edge of the sheet, the base layer and the thin layer are preferably permanently connected. Thus, after the operator has completely peeled the thin layer 16 away from the base layer 12, the operator can easily reset the thin layer 16 on the base layer 12.

A device 22 for writing on and erasing the above-described reusable medium is shown in FIGS. 1 and 2. As shown in FIG. 1, instead of a single sheet of the reusable medium, the reusable medium 10 may be made to form a continuous loop. Thus, a particular portion of the loop would first go through an erasing section 30 of the device 22 where old images are cleared. Then, the portion of the loop would go through the writing portion 40 of the device 20 where new images are formed on the cleared portion of the loop. Once the images are formed, they may be displayed either outside the device, as shown in FIG. 1, or in a display region of the device (not shown).

The erasing section 30 of the device is designed to simply separate the thin layer 16 of the reusable medium 10 from the base layer 12 of the reusable medium by breaking the adhesion of the waxy substance layer 14. Accordingly, the erasing section 30 may comprise a bar 32 extending substantially the width of the reusable medium 10. The bar 32 should preferably have a leading edge that is shaped with a narrow tip 34, as shown in FIG. 2. Such a leading edge 34 results in a smooth break in the adhesion. The bar 32 may be held in place on either side of the device or, preferably, on both sides, allowing the separated layers 16 and 12 of the reusable medium 10 to pass over opposite edges of the bar 32.

The writing portion 40 comprises a plurality of pressure applicators 42–46, shown as pins in the embodiment of FIG. 2, that may be arranged in a variety of different configurations. By way of example, the pressure applicators 42–46 may be arranged in at least one line along the width of the reusable medium. Alternatively, the pressure applicators 42–46 may be implemented by a print head that moves a small number of pins across the width of a page. The pressure pins 42–46 are movable in a direction perpendicular to the plane of the reusable medium. In operation, when a pressure pin is moved toward the reusable medium to force the thin layer 16 against the waxy adhesive layer 14, the point of contact on the thin layer 16 appears to change color. The pressure pins may be maintained away from the reusable medium if no change in color at that point is desired.

Alternatively, tiny air jets in close proximity to the medium and controlled in a manner similarly to the pins could be used as the pressure applicators 42–46 to create a force to cause adhesion between the thin layer 16 and the waxy adhesive layer 14. The air jets can be controlled by valves or micromachined valves that direct pressurized air or self-generate tiny bursts of air using a pumping action.

The reusable medium 10 can be processed through the device 22 with a mechanical drive of the type found in most dot matrix printers. Thus, the reusable medium 10 is fed through the device 22 in a manner similar to paper being fed through a printer.

The pressure applicators 42–46 are aligned with the color matrix patterning of the base layer 12. Thus, the appropriate applicator is made to apply pressure when a particular color is desired. As the reusable medium 10 is driven through the device 22, the pressure applicators continuously move back and forth to create an image. If more than one line of pressure applicators 42–46 is provided, the writing speed of the device can be significantly increased.

Figure 3:
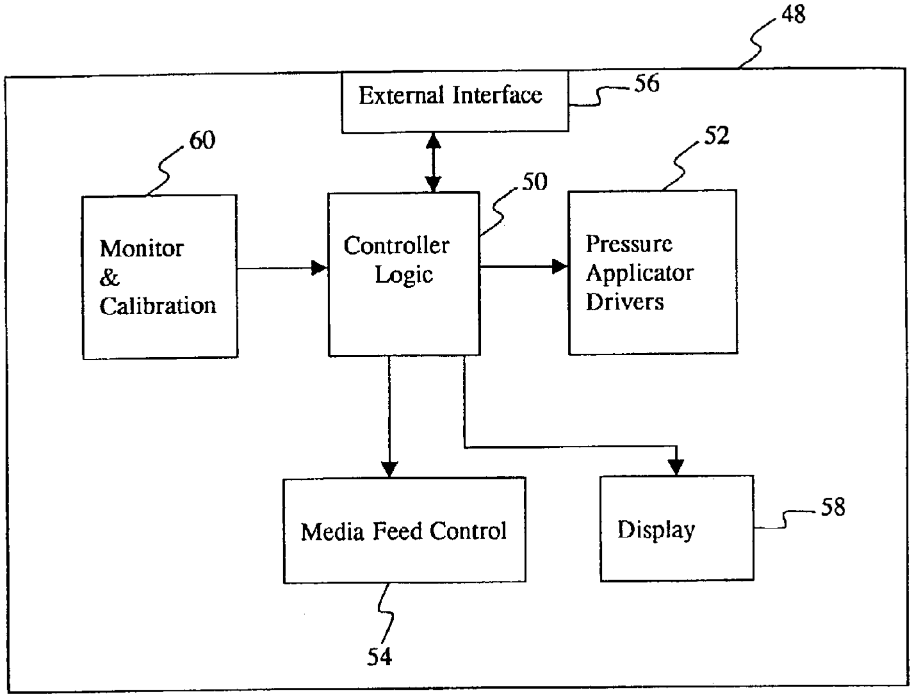
FIG. 3 is a schematic block diagram of the control logic for the device shown in FIG. 1.

The movement of the pressure applicators may be controlled by a controller 48, or a CPU, which receives input from an external source such as a PC. The controller 48 translates the input of a desired image (including text) to the required movements of the pressure applicators in conjunction with the color matrix patterning of the base layer 12. A functional block diagram of an example controller 48 is shown in FIG. 3. The controller 48 comprises a controller logic 50 for controlling drivers 52 for the pressure applicators and for controlling a medium feed control block 54. The controller 48 also includes an external interface 56 for receiving external control input commands and image data. The controller 48 also includes a display 58 for displaying appropriate control information. By way of example, the display 58 may display an aspect of the reusable medium, such as the length of the medium 10 remaining that has not been printed. Additionally, the controller 48 includes a monitor and calibration block 60 that receives signals from sensors in the system that indicate whether the pressure applicators 42–46 in the printing device are creating the desired size and density images for the particular medium 10, and whether the pressure applicators are properly aligned with the pixels if a color matrix patterned base layer 12 is used in the reusable medium 10. The monitor and calibration block 60, by way of example, could be implemented by one or more sensors, such as CCD sensors, or by a CMOS optical scanner, for sensing the light from one or more pixels to thereby monitor the density (darkness) and size of the image reflected. This information indicates whether the pressure of the pins or other pressure applicators 42–46 is too hard or too soft. Feedback control signals are then generated by comparing the measured density and size information to reference density and size information, and feedback signals are provided to control the pressure applied by the pressure applicators 42–46 accordingly. These feedback control signals could also be used to automatically adjust the printing characteristics of the device to accommodate different types of media (for example to make adjustments based on color, monochrome or other medium properties). The feedback signal could also be used to provide an indication of the state of wear of the medium 10 and to compensate for that wear. Such a signal would also provide an indication of when the medium 10 needs to be changed. Likewise, the feedback signal could provide information on the wear of the pressure applicators 42–46. In one embodiment, pressure applicator test patterns could be created over a range of pressures from light to hard, and the size and density of the resulting images measured against a preferred image size and density.

In embodiments where multiple colors are used in a configuration such as that shown in FIG. 4, then preferably after the aforementioned calibration of the printing characteristics for the medium 10, the monitor and calibration block 60 would generate an alignment feedback signal to adjust the alignment of the pressure applicators 42–46 relative to the pixels on the medium 10. In a preferred embodiment, image patterns created by dithering the alignment of the pressure applicators 42–46 may be detected and the colors monitored. For example, if one or more pressure applicators 42–46 are to be aligned over a cyan pixel on the medium 10 when properly calibrated, then the colors reflected back after application of pressure by those pressure applicators would be separately measured for a series of different alignments of those pressure applicators. The alignment which resulted in the maximum amount of the color cyan being detected and measured would be selected as the desired alignment for the pressure applicators.

The foregoing describes pressure applicators applying pressure to the thin layer 16. Alternatively, pressure may be applied from the opposite direction to a sufficiently flexible base layer, causing points in the base layer to adhere to points on the thin layer, providing the same desired result. Alternatively, as noted above, jets or burst of air can be used to provide pressure.

The foregoing describes the reusable medium as providing color capability. In a further aspect of the invention, an adhesion layer 14 could be provided which would cause the thin layer 16 to adhere to the base layer 12 to provide a change in other reflective properties of the thin layer such as contrast or diffusion. By way of example, one or more additional layers could be included as part of the adhesive layer 14, such as a diffusion layer to soften image quality, a film layer to enhance contrast, a film layer to change the angle of view, an anti-reflective film, or any other film that realizes a desired property.

In a preferred embodiment, the pressure pins may be designed with dome shaped tips. Thus, increasing the pressure applied to the thin layer with the pressure pins increases the area of adhesion, allowing variability of the thickness and density of the images.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

I claim:

1. A reusable medium, comprising:

a first layer of a first material, wherein said first layer comprises a plurality of color segments each having one color;

a second layer of a second material;

a layer of adhesive disposed on said first layer between said first layer and said second layer;

wherein one of said first layer or said adhesive contains a color and wherein said layer of adhesive causes an image to be formed on said second layer when said second layer is selectively contacted to said layer of adhesive; and wherein said layer of adhesive comprises a plurality of separated regions, wherein each color segment of the plurality of color segments is disposed adjacent a corresponding one of said plurality of separated regions.

2. The reusable medium according to claim 1, wherein a plurality of said regions of said adhesive contain a different color.

3. The reusable medium according to claim 1, wherein a plurality of said regions of said adhesive have optical properties to allow them to transmit color from said first layer to a surface of said adhesive adjacent to said second layer.

4. The reusable medium according to claim 1, wherein said adhesive is made from a group consisting of beeswax and paraffin.

5. The reusable medium according to claim 1, wherein said plurality of color segments are separated from each other by spaces.

6. The reusable medium according to claim 1, wherein said plurality of separated regions of adhesive are separated by a mesh of light blocking material.

* * * * *